US006731713B1

(12) United States Patent
Beard

(10) Patent No.: US 6,731,713 B1
(45) Date of Patent: May 4, 2004

(54) METHOD AND APPARATUS FOR REDUCING RF EMISSION LEVELS IN A PORTABLE ELECTRONIC DEVICE

(75) Inventor: Paul Beard, Milpitas, CA (US)

(73) Assignee: Intermec IP Corp., Everett, WA (US)

( * ) Notice: Subject to any disclaimer, the term of this patent is extended or adjusted under 35 U.S.C. 154(b) by 0 days.

(21) Appl. No.: 09/677,083

(22) Filed: Sep. 29, 2000

Related U.S. Application Data

(63) Continuation of application No. 08/896,132, filed on Jul. 17, 1997, now abandoned.
(60) Provisional application No. 60/021,948, filed on Jul. 17, 1996.

(51) Int. Cl.[7] .................................................. H03D 3/24
(52) U.S. Cl. ...................................................... 375/376
(58) Field of Search ................................ 375/375, 295, 375/296, 273; 332/127, 128

(56) References Cited

U.S. PATENT DOCUMENTS 4,507,796 A  *  3/1985  Stumfall ...................... 375/376
5,900,785 A  *  5/1999  Freed ........................... 331/10

* cited by examiner

Primary Examiner—Khai Tran

(57) ABSTRACT

A method and apparatus for reducing radio frequency emissions in a portable electronic device is described. A source signal is modulated with a modulating signal to attenuate the level of the signal while maintaining the power level of the signal.

26 Claims, 4 Drawing Sheets

METHOD AND APPARATUS FOR REDUCING RF EMISSION LEVELS IN A PORTABLE ELECTRONIC DEVICE

CROSS REFERENCE TO RELATED APPLICATIONS

The present application is a continuation of application Ser. No. 08/896,132 filed Jul. 17, 1997, now abandoned. Said application Ser. No. 08/896,132 claims the benefit, under 35 USC 119(e), of the U.S. Provisional Application Ser. No. 60/021,948 filed Jul. 17, 1996.

Said application Ser. No. 08/896,132 and said U.S. Provisional Application Ser. No. 60/021,948 are incorporated herein by reference in their entireties.

BACKGROUND OF THE INVENTION

The present invention generally relates to the field of portable electronic devices, and more particularly to a method and apparatus for attenuating RF emission levels in a portable electronic device.

Advents in the performance of microcomputer based electronics have resulted in dramatic increases in operating speeds of logic switching circuits. Increased switching and operating speeds correspond to increased bandwidths of the electronic signals transmitted within the interior of the electronic device which become a significant source of radio frequency emissions. Unintentional radio frequency emissions undesirably interfere with the internal circuitry of the device itself and with other electronic devices operating within the vicinity of the emitting device. The radio frequency emissions at these higher frequencies may cause undesirable electromagnetic coupling between data paths resulting in cross-channel interference, for example.

The amount of internally generated radio frequency emissions must be limited to the guidelines and regulations set by governmental agencies such as the FCC. For example, the FCC mandates that Class B digital devices operating at frequencies in the range of 30 to 80 MHz may not produce unintentional radiated emissions having a field strength above 100 microvolts per meter at a distance of three meters from the device. For frequencies ranging from 88 to 216 MHz the limit is 150 microvolts per meter.

Shielding, the intentional blocking of an electromagnetic field, of the electronic device is typically utilized to attenuate radio frequency emissions in order to comply with agency regulations. Shielding comprises applying a continuous metallic conductor coating to the interior surfaces of the housing shell of an electronic device to form a gaussian surface which prevents electromagnetic fields from passing through the shielding surface. The ideal material for shielding electromagnetic radiation exhibits both high electrical and magnetic conductivity. The conductor surface acts as an electromagnetic barrier to block unintentional or incidental radio frequency emissions from passing therethrough.

However, no shielding barrier is 100 percent effective in blocking radio frequency emissions. The percent of energy that is blocked is called the shielding effectiveness. Shield continuity, the effectiveness of shielding, is a measure of the degree to which a shield confines or inhibits the electromagnetic field. Because this parameter depends upon the frequency of the electric field, shielding becomes less effective with increasing frequencies. Therefore the reduction of shield continuity at higher frequencies increases in importance as the operational frequencies utilized in portable electronic devices increase.

The effectiveness of an electromagnetic shield is additionally a function of the continuity, or physical completeness, of the barrier. The shield continuity factor is defined as the ratio of the actual shield conductor surface area to the total surface area which the shield area encloses. A solid metal enclosure, with absolutely no holes or gaps and being excellent conductor provides 100 percent shielding continuity. If there are holes or gaps within the shielding, the effectiveness will be less than 100 percent. If it were possible to build an electronic device with a continuous, uninterrupted conductive shield, clearly no charge could enter or leave the terminal. Unfortunately, practical electronic devices have electrical input and output paths and openings required for displays, keys and the like. The required openings in the electronic device prevent the shield from forming a completely closed surface. Therefore, the shielding continuity factor will always be less than one (i.e. less than 100 percent shielding effectiveness).

A possible solution to this problem is to provide specialized treatment of the signal at the point of entry and egress in the device in an attempt to better approximate an ideal, closed surface shield. However, such treatment is often either too costly or too impractical to implement in the constrained space of a small electronic device. Additionally, the shielding coating applied to the internal surfaces of the device increases the cost of the device and requires additional steps in the manufacturing process.

Thus, it would be desirable to reduce the radio frequency emissions from a portable electronic device without the need for shielding the interior surfaces of the housing of the electronic device with an electrically conductive, paramagnetic material. Alternatively, it would be desirable to reduce the radio frequency emissions from a portable electronic device by complementing the less than ideal effectiveness of standard shielding techniques including overcoming the reduction in shielding effectiveness exhibited at higher frequencies.

In addition, it is often desirable to be able to provide a portable electronic device utilizing radio frequency communications signals of increased or greater power without exceeding the maximum signal levels mandated by regulatory agencies.

SUMMARY OF THE INVENTION

Accordingly, it is a goal of this invention to provide a method and apparatus for reducing radio frequency emission levels in a portable electronic device.

Another goal is to provide a method and apparatus for reducing radio frequency emission levels without requiring to coat the interior surfaces of the housing of the electronic device with an electrically conductive or paramagnetic material.

A further goal is to provide a method and apparatus for reducing radio frequency emission levels in a portable electronic device which complements the less than ideal shielding effectiveness of an interior shielding coating.

Yet another goal is to provide a method and apparatus for reducing radio frequency emission levels in a portable electronic device which overcomes the loss of shielding effectiveness of an interior shielding coating with increasing frequencies.

These and other goals may be achieved by modulating signals which may be a source for radio frequency emission levels above levels mandated by agency regulations such that the voltage gain levels of the signals are reduced without decreasing the power level of the signals.

More specifically, a method for reducing radio frequency emissions in a portable electronic device comprises the steps of modulating a source signal about its center frequency by modulation of the source frequency with a modulating frequency.

In addition, an apparatus for reducing radio frequency emissions in a portable electronic device comprises a frequency modulator receiving a source signal and modulating signal for modulating the source signal with the modulating signal to produce an output signal which is an attenuated version of the source signal having the same power level as the source signal.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DESCRIPTION OF THE PREFERRED EMBODIMENT

Reference will now be made in detail to the presently preferred embodiment of the invention, an example of which is illustrated in the accompanying drawings.

Figure 1:
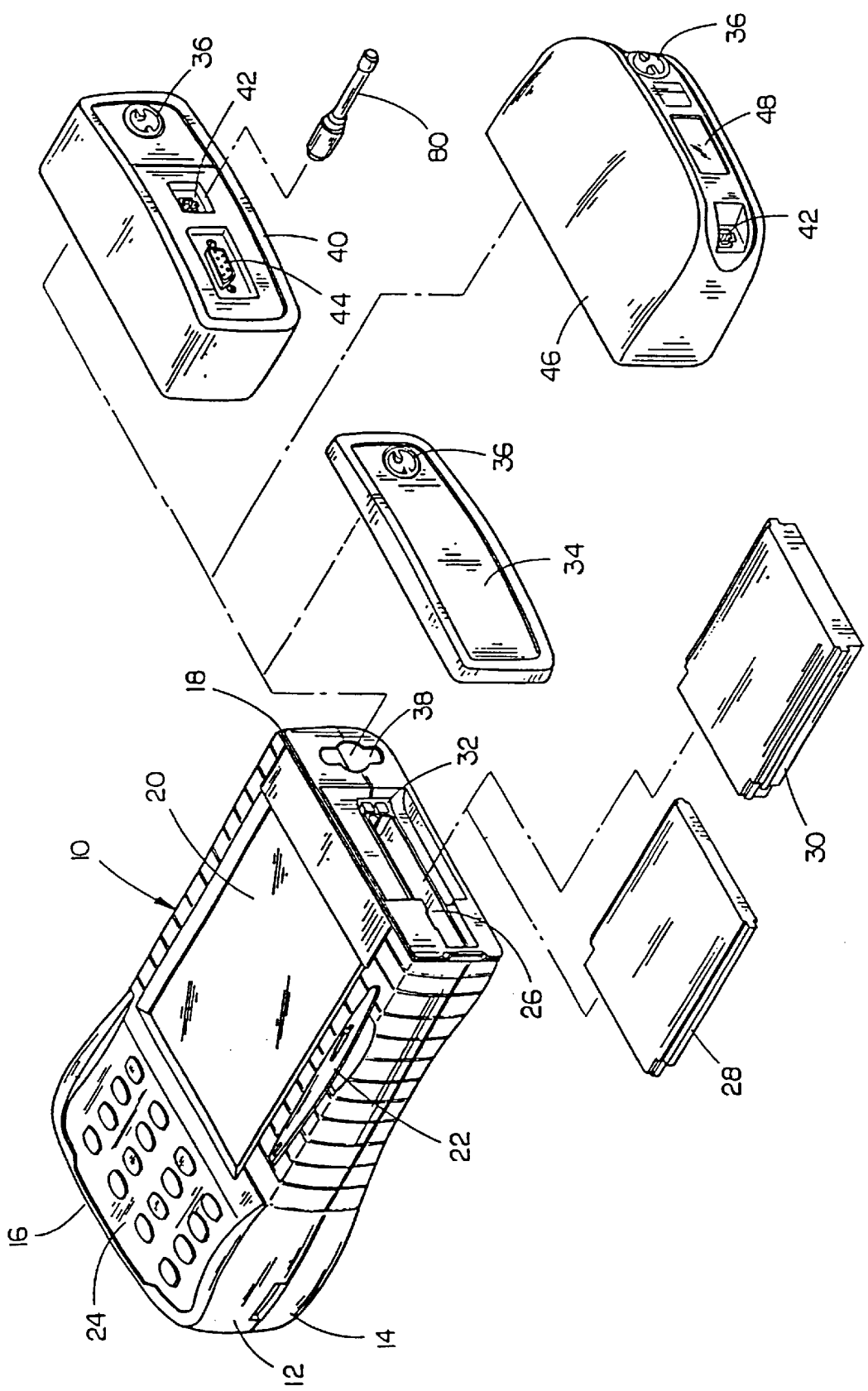
FIG. 1 is an isometric view of a hand-held portable data terminal which may incorporate the present invention.

FIG. 1 illustrates a typical electronic device which may utilize the radio frequency emissions reduction method and apparatus of the present invention. Shown in FIG. 1 is a hand-held portable data terminal which is utilized in data collection, warehouse and route accounting applications, for example. The hand-held data terminal 10 utilizes a microprocessor based architecture for high power data processing applications. The terminal 10 generally comprises an upper housing shell 12 and a lower housing shell 14 and a bottom end 16 and a top end 18. A display 20 may be disposed on the upper shell surface 12 near the top end 18. The display 20 is typically a liquid-crystal display and may incorporate touch screen input means for tactile input or input with a stylus 22. The terminal 10 may include a keypad 24 as a further means of input.

The terminal shown in FIG. 1 may be versatile and modularly utilize multiple electronic peripherals and systems. For example the terminal may have a PCMCIA receptacle 26 for receiving various PC cards 28 and 30. Card ejector buttons are preferably included. A basic end cap 34 may be utilized to cover the PCMCIA card receptacles 26 and be secured with a male 36 and female 38 interlocking fastener system. Alternatively, a data file reader end cap 46 may be utilized which may house laser scanner or CCD reader circuits for data file reading operations (e.g., bar code reading). The end cap 46 may include a connector jack 42 and a window 48 for use with the data file reader. A further alternative end cap 40 may be utilized having various types of electrical connectors, receptacles or jacks 42 and 44 for various communications interfaces. Further, and antenna 80 may be operatively insertable into a receptacle for radio frequency communications (e.g., RF modem or LAN link, etc.).

Figure 2:
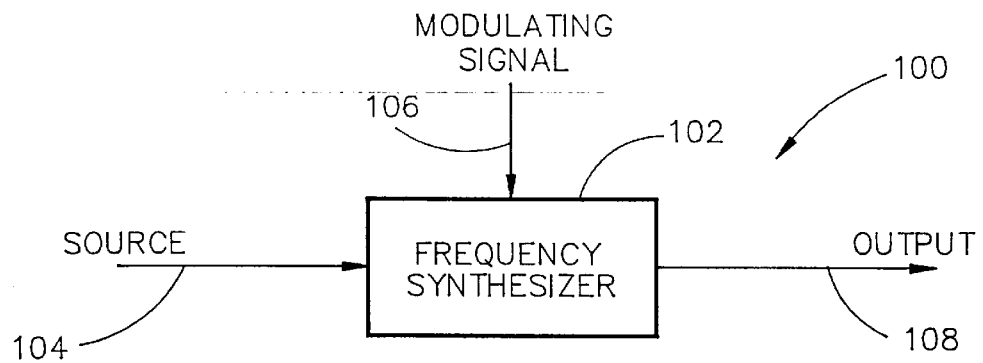
FIG. 2 is a schematic diagram of the radio frequency emissions reduction apparatus of the present invention.

FIG. 2 is a somewhat schematic diagram of the radio frequency emissions reduction apparatus of the present invention. The radio frequency emissions reduction apparatus 100 comprises a frequency synthesizer 102 which has a source signal input 104, a modulating signal input 106 and an output 108. The frequency synthesizer 102 comprises a phase-locked loop, a system that utilizes feedback to maintain an output signal in a specific phase relationship with a reference signal. The phase-locked loop design is utilized to implement frequency modulation of the loop source input signal. The source signal applied to the input 104 of the frequency synthesizer 102 is the system clock signal of the hand-held portable data terminal 10 illustrated in FIG. 1. The system clock signal, or signals, is typically the highest frequency signal present in a portable electronic device and is generally the main source of unintended radio frequency emissions. For example, the hand-held portable data terminal shown in FIG. 1 may have a system clock operating at a frequency on the order of 25 MHz to 33 MHz for driving a 386 class 33 MHz central processor. The clock signal is fed into the frequency synthesizer as the source input signal to be modulated with a modulating input signal. The resultant output signal is a function of the source signal and the modulating signal.

Figure 3:
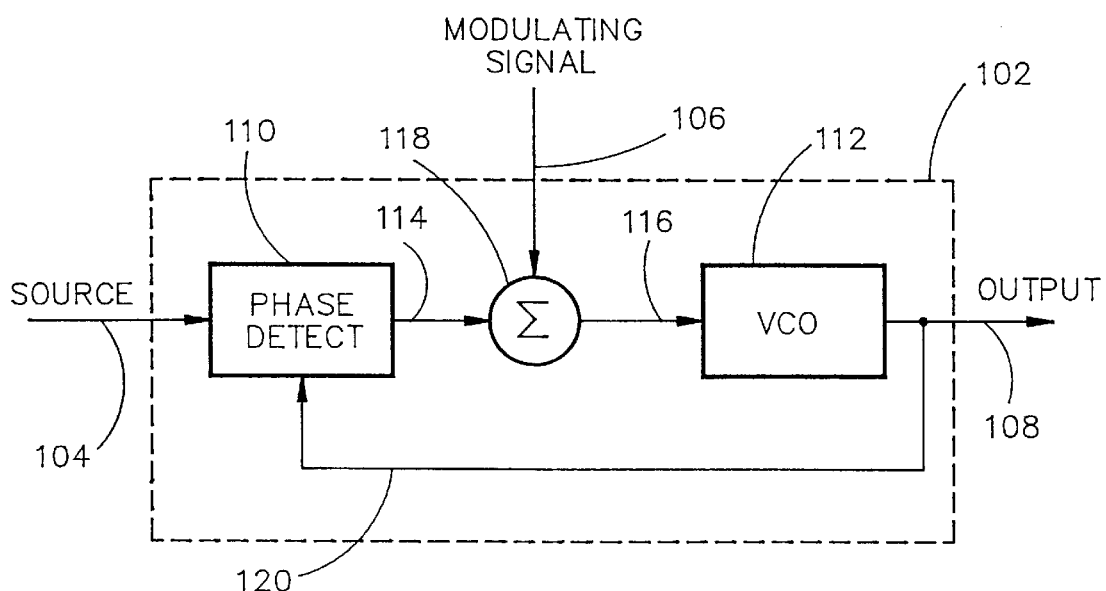
FIG. 3 is a schematic diagram of the radio frequency emissions reduction apparatus of the present invention illustrating basic components thereof.

FIG. 3 depicts the essential subcomponents of the frequency synthesizer illustrated in FIG. 2. The frequency synthesizer 102 essentially comprises a phase detector ("PHASE DETECT") 110 and a voltage-controlled oscillator ("VCO") 112. The phase detector 110 produces an output voltage proportional to the phase difference of two input signals. The voltage-controlled oscillator 112 produces an ac output signal having a frequency proportional to its input voltage. The phase detector 110 receives a source signal at its first input 104 which is also the input to the frequency synthesizer 102. The phase detector output 114 is fed into voltage-controlled oscillator input 116. The modulating signal 106 is added to the phase detector output 114 via summing element 118. Thus, the signal fed into the VCO input 116 is a signal which is the sum of the phase detector output 114 and the modulating signal 106.

The voltage-controlled oscillator 112 produces a signal at its output which is proportional to the sum of the phase detector output 114 and the modulating signal 106. The output 108 of the voltage controlled oscillator is also the output of the frequency synthesizer 102. The output signal 108 of the voltage controlled oscillator 112 is fed back into the phase detector 120 via feedback line 120 which is also the second input to the phase detector 110. The phase detector 110 produces an output 114 which is proportional to the phase difference between the source input 104 and the output 108 of the voltage-controlled oscillator 112.

Figure 4:
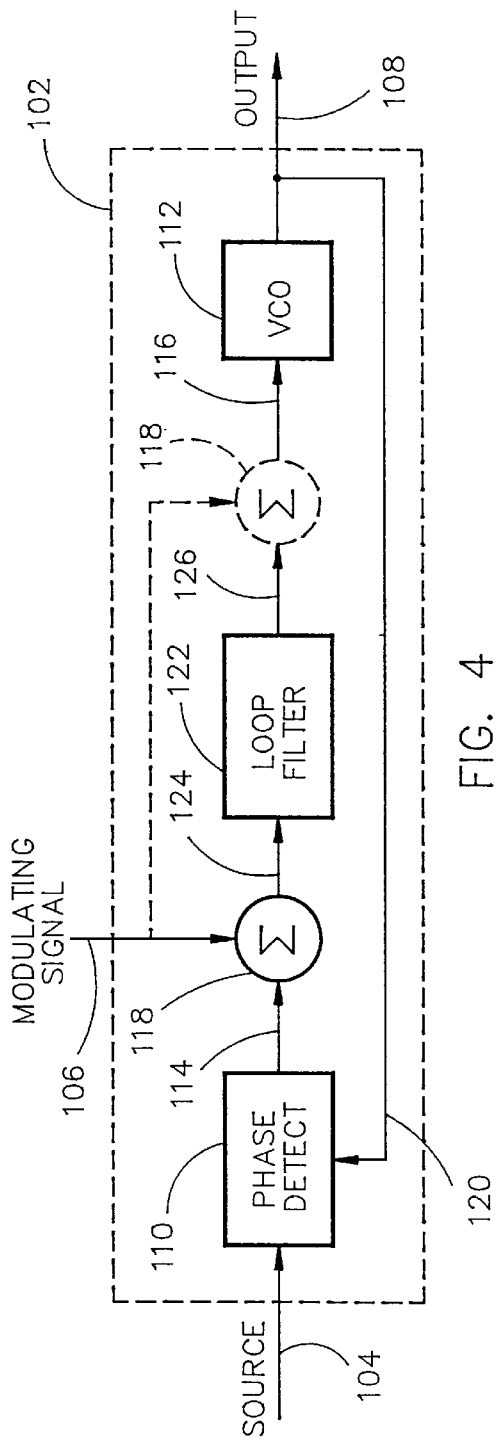
FIG. 4 is a schematic diagram of the radio frequency emissions reduction apparatus of the present invention further illustrating a loop filter.

FIG. 4 illustrates the frequency synthesizer of FIG. 3 further including a loop filter. A loop filter 122 may be added in the forward path of the frequency synthesizer 102 to control the operating characteristics and overall response of the frequency synthesizer 102. The loop filter input 124 may receive the phase detector output 114 and the loop filter output 126 may feed into the VCO input 116. The loop filter 122 may comprise entirely passive components or may be an active filter. The loop filter typically may be utilized to produce a second-order response characteristic in the frequency synthesizer 102. The passive implementation of the loop filter is typically a passive lag circuit. Because the phase detector 110 is typically a multiplier type circuit, the loop filter 122 is utilized to remove the frequency component from the output 114 of the phase detector 110 which is the sum of the inputs 104 and 120 fed into the phase detector 100. Additionally, the loop filter 122 is utilized to remove out of band RF signals inadvertently received by the phase detector 110.

The loop filter 122 may be placed before or after the summing element 118 in the forward signal path of the frequency synthesizer 102. Typically, the modulating signal 106 is added to the output of the loop filter 122 in which case the loop filter 122 is placed before summing element 118 as shown by the dashed lines in FIG. 4. However, the modulating signal 106 of the present invention may be a square wave containing frequency components in addition to the fundamental frequency which may adversely affect the stability of the synthesizer 102 and the modulation of the source signal 104. Therefore, the loop filter 122 may be placed after the summing element 118, as shown by the solid lines, such that the loop filter may attenuate undesired frequency components present in the modulating signal 106.

Figure 5:
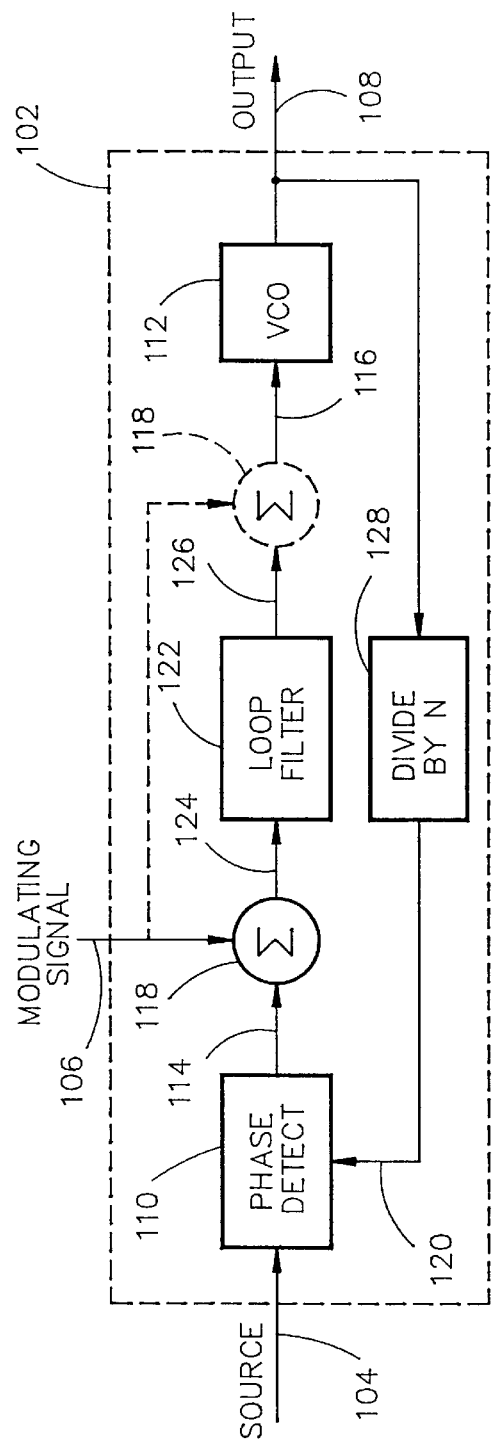
FIG. 5 is a schematic diagram of the radio frequency emissions reduction apparatus of the present invention further illustrating a divide by N component.

FIG. 5 illustrates the frequency synthesizer of FIG. 4 further including a divide by N circuit. The divide by N circuit 128 is placed into the feedback loop of the frequency synthesizer between the output 108 of the voltage-controlled oscillator 112 and the second input 120 of the phase detector 110. The divide by N circuit 128 produces an output signal whose frequency is an integer division of its input signal frequency. The divide by N circuit 128 may be utilized to achieve various desired output frequencies.

Figure 6:
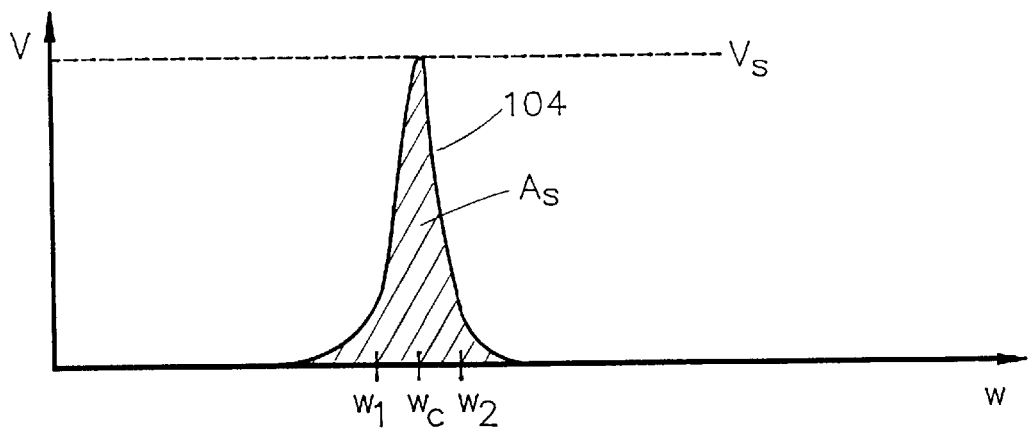
FIG. 6 illustrates a typical source signal processed by the radio frequency emissions reduction apparatus of the present invention.
Figure 7:
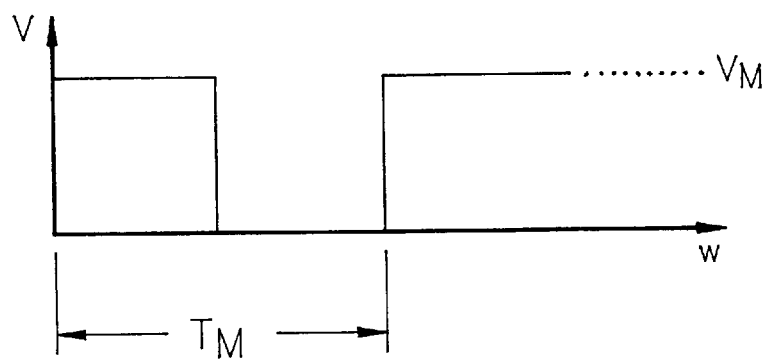
FIG. 7 illustrates a modulating signal of the radio frequency emissions reduction apparatus of the present invention.

FIG. 6 is a graphical representation of the frequency response of a typical source signal to be processed by the radio frequency emissions reduction method and apparatus of the present invention. The source signal to be processed for emissions reduction in digital electronic devices such as the hand-held portable data terminal of FIG. 1 is typically the system clock signal (see FIG. 7 showing a clock type signal). The system clock signal is a binary signal that serves as a time synchronizing standard for digital logic circuits and for setting the speed of operation of the system microprocessor. The clock signal is ideally a perfect square wave, however in practice the clock exhibits some slewing in the rise and fall time of the leading and falling edges of the wave as an inherent artifact of practical circuits which may slightly affect the frequency components of the clock signal. The frequency response of a typical clock signal is shown in FIG. 6.

The fundamental frequency of the square wave is the represented as the center frequency $\omega_C$. If the system clock signal were a sine wave, then only a singular frequency component of the wave would exist at $\omega_C$ having an amplitude of $V_S$ at $\omega_C$. However, the clock signal is actually a half-wave rectified square wave, or pulse wave, having additional frequency components present when the signal is resolved into a fourier series representation. Thus, the clock signal exhibits additional components centered about its fundamental center frequency $\omega_C$ as shown in FIG. 6. The effective bandwidth of the source signal may be represented by $\beta_S=\omega_2-\omega_1$ where $\omega_1$ and $\omega_2$ are the points on the graph of the 30 signal where the signal level is $V_S/\sqrt{2}$.

FIG. 7 illustrates the modulating signal of the present invention. The modulating signal 106 may be an additional clock in the clock system of the hand-held portable data terminal. Being a clock signal, the modulating signal is shown to be a pulse wave having an amplitude of $V_M$ and a period of $T_M=2\pi/\omega_M$. The modulating signal may be a clock signal generated by a crystal oscillator having a natural resonant frequency of 32 kHz, for example.

Figure 8:
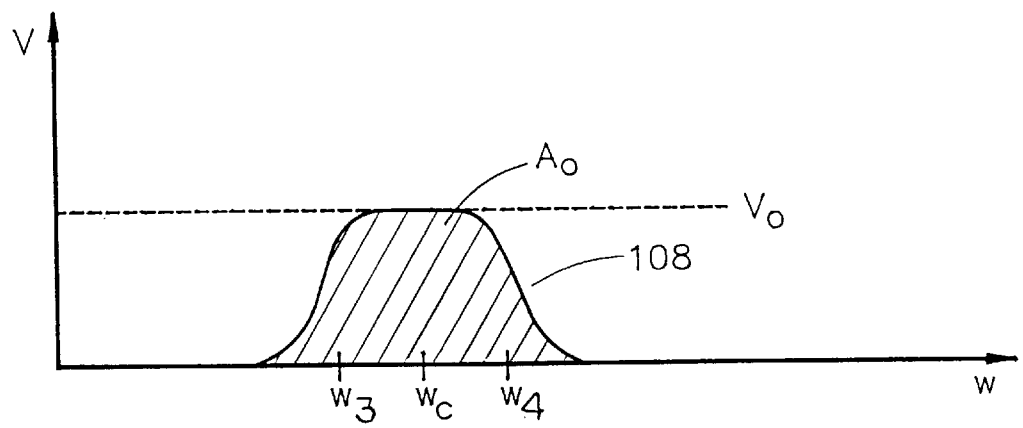
FIG. 8 illustrates the resultant output signal processed by the radio frequency emissions reduction apparatus of the present invention.

FIG. 8 illustrates the resultant output signal produced at the output of the radio frequency emissions reduction apparatus of the present invention. The output signal has an attenuated amplitude of $V_O$ in comparison to the amplitude $V_S$ of the input signal. Simultaneously, the bandwidth of the output signal, represented as $\beta_O=\omega_4-\omega_3$, has been increased in comparison to the bandwidth, $\omega_2-\omega_1$, of the input signal 104. Thus, the bandwidth $\beta_O$ of the output signal may be represented as $\omega_C+/-\frac{1}{2}\omega_M$ where $\omega_C+\frac{1}{2}\omega_M=\omega_4$ and $\omega_C-\frac{1}{2}\omega_M=\omega_3$. The reduction in amplitude and increase of bandwidth in comparison of the input signal with the output signal may be such that the power of the input and output signals are approximately equal. This is represented graphically by FIGS. 6 and 8 in that the area $A_S$ under the graph of the input signal 104 is approximately equal to the area $A_O$ under the graph of the output signal 108. Thus, the peak amplitude of the source signal may be thereby reduced without a corresponding reduction in the power level of the signal.

An object of the present invention is to reduce the radio frequency emissions level at the suspect frequency at the range specified by agency regulations. For example, for a system clock of 33 MHz, the FCC specifies a maximum field strength of 100 microvolts per meter ($\mu$V/m) at a distance of three meters from the device in question. Assume at three meters from the data terminal the field strength was measured to be 140 $\mu$V/m, which is above the allowed limit of 100 $\mu$V/m. The RF emissions reduction apparatus of the present invention may attenuate the field strength of the emissions by 3 dB at a distance of three meters from the emission source placing the emissions level field strength at 99.1 $\mu$V/m.

Assuming a point source model for the electric field generated by the data terminal such that the electric potential is proportional to the reciprocal of the radial distance from the point source, a field strength of 99.1 $\mu$V/m at three meters corresponds to an electric potential of 3.54 V at the field source. Thus, the voltage level $V_S$ of a source clock signal 104 having a value of 5 V would be reduced to the output level $V_O$ of 3.54 V at the output signal 108 which should still be well above the minimum high level input voltage (i.e. $V_{IH}$) of most 5 V logic devices, which typically may be 2 V minimum. Thus, the signal level of a 5 V source signal may be attenuated by as much as 8 dB without adversely affecting the operation of the data terminal system (i.e., a 5 V signal attenuated by 8 dB results in a 2 V signal).

The power spectral densities of the input signal 104 and the output signal 108 may be shown by example in FIGS. 6 and 8. Because the bandwidth of the processed output signal 108 is correspondingly increased due to signal modulation, the power of the output signal 108 may be designed to be approximately equal to the power of the input signal 104. It is essential that there is no power loss in the source signal so that the fan out rating of the system clock is not decreased due to the processing of the source signal (i.e. the number of load devices which may be simultaneously driven by the clock signal is not decreased). Thus, the present invention provides the advantage over conventional methods in maintaining the power level of the source signal (e.g., merely utilizing a conventional resistor divider network to attenuate the clock signal from would result in a loss of signal power and impedance mismatch). The output impedance of the RF emissions reduction apparatus 100 may be the output impedance of the VCO 112. The power of the output signal may be manipulated by varying the frequency of the modulating signal 122, or through control of the divide by N device 128 whereby the bandwidth of the output signal 108 may be varied, for example to double the bandwidth of the source signal. Further, when the loop filter 122 of the present invention is an active filter, the forward gain of the RF emissions reduction apparatus 100 may be controlled by varying the gain of the loop filter 122.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. In a hand-held portable electronic device, an apparatus for reducing radio frequency emissions which processes a source signal having a characteristic power, gain and bandwidth which is a potential unintended source of radio frequency emissions to produce a processed output signal having reduced potential for radio frequency emissions and not containing information which is intended to be radiated, said apparatus comprising a frequency synthesizer having a source input receiving the source signal, a modulating input receiving a modulating signal and an output for producing an output signal being a modulated version of the source signal wherein the gain of the source signal is reduced, and the bandwidth of the source signal is increased such that the power of the processed output signal is increased, whereby the power of the processed output signal is approximately equal to the power of the source signal.

2. The apparatus of claim 1 wherein the modulating signal comprises a square wave which does not contain information which is intended to be radiated.

3. The apparatus of claim 1 wherein the frequency of the modulating signal is greater than three decades from the frequency of the source signal.

4. The apparatus of claim 1 wherein the frequency of the modulating signal is approximately three decades from the frequency of the source signal.

5. The apparatus of claim 1 wherein said frequency synthesizer is an FM frequency synthesizer.

6. In a hand-held portable electronic device, an apparatus for reducing radio frequency emissions from the device wherein a source signal having a characteristic power, gain and bandwidth which is a potential unintended source of radio frequency emission is processed to produce a processed output signal having reduced potential for radio frequency emissions, said apparatus comprising:

(a) a voltage controlled oscillator for producing an output signal at an oscillator output having a frequency proportional to the input signal at an oscillator input of said voltage controlled oscillator;

(b) a phase detector for producing an output signal at a phase detector output proportional to the phase difference between first and input signals at first and second phase detector inputs of said phase detector, the first phase detector input receiving the source signal and the second phase detector input receiving the output signal of said voltage controlled oscillator, said input signal of said voltage controlled oscillator being fed through a loop to the phase detector output of said phase detector;

(c) a modulating signal being applied to said input signal of said voltage controlled oscillator; and (d) the processed output signal being the output signal of the voltage controlled oscillator, the processed output signal being a modulated version of the source signal wherein the gain of the source signal is thereby reduced and the bandwidth of the source signal is increased such that the power of the processed output signal is approximately equal to the power of the source signal;

(e) wherein the modulating signal does not contain information which is intended to be radiated.

7. The apparatus of claim 6 further comprising a loop filter operatively connected between the phase detector output of said phase detector and the oscillator input of said voltage controlled oscillator for limiting the range of frequencies of the source signal to be processed.

8. The apparatus of claim 6 wherein the modulating signal comprises a square wave which does not contain information which is intended to be radiated.

9. The apparatus of claim 6 wherein the frequency of the modulating signal is greater than three decades from the frequency of the source signal.

10. The apparatus of claim 6 wherein the frequency of the modulating signal is approximately three decades from the frequency of the source signal.

11. The apparatus of claim 6 further comprising a divide by N circuit operatively connected between the oscillator output of said voltage controlled oscillator and the second phase detector input of said phase detector, said divide by N circuit for producing an output signal having a frequency being an integer division of its input signal frequency.

12. In a hand-held portable electronic device, a method for reducing radio frequency emissions from the device wherein a source signal having a characteristic power, gain and bandwidth which is a potential unintended source of radio frequency emissions is processed to produce a processed output signal having reduced potential for radio frequency emissions, said method comprising modulating the source signal with a modulating signal by varying the source signal about the center frequency of the frequency response of the source signal wherein the gain of the source signal is thereby reduced and the bandwidth of the source signal is thereby increased such that the power of the processed output signal is approximately equal to the power of the source signal.

13. The method according to claim 12 wherein the modulating signal comprises a square wave which does not contain information which is intended to be radiated.

14. The method according to claim 12 wherein the frequency of the modulating signal is greater than three decades from the frequency of the source signal.

15. The method according to claim 12 wherein the frequency of the modulating signal is approximately three decades from the frequency of the source signal.

16. The method according to claim 12 wherein the bandwidth of the processed output signal is approximately twice the bandwidth of the source signal.

17. A portable electronic device comprising
(a) a signal source which generates a source signal with a source signal waveform as a function of frequency for use in internal circuits of the device which internal circuits are not used for producing intentional radiation, said source signal waveform having a relatively peaked amplitude and a relatively narrow bandwidth; and
(b) apparatus for processing said source signal waveform to produce a processed output signal having a relatively increased bandwidth and a relatively reduced amplitude, and having a substantially reduced potential for causing unintended radio frequency emissions;
(c) said apparatus comprising a frequency synthesizer having a source input receiving the source signal, a modulating input receiving a modulating signal, and an output connected to the internal circuits of the device which are not used for producing intentional radiation, for supplying to said internal circuits for use therein, said processed output signal as a modulated version of the source signal,
(d) wherein, while the amplitude of the source signal is reduced, the bandwidth of the source signal is increased such that the power of the processed output signal meets the requirements of the internal circuits.

18. In an electronic device which generates a source signal with a source signal waveform as a function of frequency, for use in internal circuits of the device, said source signal waveform having a relatively peaked amplitude and a relatively narrow bandwidth, a method for processing said source signal waveform, said method comprising
(a) processing the source signal to produce a processed output signal having a substantially reduced potential for causing unintended radio frequency emissions, and such that the amplitude of the processed output signal waveform in comparison to the amplitude of the source signal is relatively reduced, while the bandwidth of the processed output signal in comparison to the bandwidth of the source signal is relatively increased, to produce the processed output signal with said substantially reduced potential for causing unintended radio frequency emissions, and
(b) supplying the processed output signal to the internal circuits of the device.

19. The method of claim 18, wherein the processed output signal is used as a clock signal waveform for the internal circuits of the device.

20. The method of claim 18, wherein the processed output signal exhibits substantially the highest frequency present in the portable electronic device.

21. The method of claim 18, wherein the processed output signal has a frequency so as to be substantially a main source of unintended radio frequency emissions.

22. The method of claim 18, wherein the source signal is not used in the production of an intentionally radiated signal.

23. The method of claim 18, wherein the processed output signal is not used for an intentionally radiated signal.

24. The method of claim 18, wherein the processed output signal is produced with the use of a modulating signal that does not represent intelligence to be radiated by an intentionally radiated signal.

25. The method of claim 18, wherein the processed output signal is supplied to an internal circuit other than an internal circuit used in generating a signal that is to be intentionally radiated.

26. The method of claim 18, wherein the processed output signal while of reduced amplitude, has a sufficiently increased bandwith so as to operate all of the internal circuits that could be operated by the source signal waveform.

* * * * *